United States Patent
Pun (10) Patent No.: US 7,742,399 B2
(45) Date of Patent: *Jun. 22, 2010

(54) MOBILE AD-HOC NETWORK (MANET) AND METHOD FOR IMPLEMENTING MULTIPLE PATHS FOR FAULT TOLERANCE

(75) Inventor: Ngan-Cheung Pun, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/425,837

(22) Filed: Jun. 22, 2006

(65) Prior Publication Data

US 2009/0323519 A1 Dec. 31, 2009

(51) Int. Cl.
*G06F 11/00* (2006.01)
(52) U.S. Cl. .................. 370/218; 370/227; 370/329; 370/351
(58) Field of Classification Search .................. None
See application file for complete search history.

(56) References Cited

U.S. PATENT DOCUMENTS

| | | | |
|---|---|---|---|
| 5,430,729 A * | 7/1995 | Rahnema | 370/409 |
| 6,628,620 B1 | 9/2003 | Cain | 370/248 |
| 6,894,985 B2 | 5/2005 | Billhartz | 370/252 |
| 6,975,614 B2 | 12/2005 | Kennedy | 370/338 |
| 7,330,694 B2 * | 2/2008 | Lee et al. | 455/7 |
| 2002/0167960 A1 | 11/2002 | Garcia-Luna-Aceves | 370/442 |
| 2003/0151513 A1 * | 8/2003 | Herrmann et al. | 340/573.1 |
| 2003/2016141 | 11/2003 | Antoniou et al. | 455/450 |
| 2004/0218582 A1 * | 11/2004 | Kennedy et al. | 370/351 |
| 2005/0053004 A1 | 3/2005 | Cain et al. | 370/235 |
| 2005/0074025 A1 | 4/2005 | Shao et al. | 370/461 |
| 2005/0254430 A1 * | 11/2005 | Clark et al. | 370/241 |
| 2005/0286464 A1 * | 12/2005 | Saadawi et al. | 370/328 |
| 2006/0253570 A1 * | 11/2006 | Biswas et al. | 709/224 |

FOREIGN PATENT DOCUMENTS

WO 02/078229 3/2002

OTHER PUBLICATIONS

Das, B. et al., "Routing in Ad-Hoc Networks Using Minimum Connected Dominating Sets," Communications, 1997, ICC '97 Montreal, Towards the Knowledge Millenium, 1997 IEEE International Conference on Montreal, Que, Canada, vol. 1, Jun. 8, 1997, pp. 376-380.

* cited by examiner

*Primary Examiner*—Chi H. Pham
*Assistant Examiner*—Shick Hom
(74) *Attorney, Agent, or Firm*—Allen, Dyer, Doppelt, Milbrath & Gilchrist, P.A.

(57) ABSTRACT

A mobile ad-hoc network (MANET) communicates between a source node and destination node and includes a plurality of intermediate nodes. A main communication path is established between the source node through intermediate nodes to the destination node based on an underlying routing protocol. Alternative communication paths are established among neighboring nodes as standby nodes that are positioned an "n" hop distance from nodes of the main communication paths to form a tube of multiple communication paths from the source node to the destination node. The main communication path reconfigured within the tube of multiple communication paths to an alternative communication path using at least one standby node when the main communication path is broken.

24 Claims, 4 Drawing Sheets

MOBILE AD-HOC NETWORK (MANET) AND METHOD FOR IMPLEMENTING MULTIPLE PATHS FOR FAULT TOLERANCE

FIELD OF THE INVENTION

The present invention relates to mobile ad-hoc communications networks, and more particularly, to channel access scheduling and related methods used in mobile ad-hoc communications.

BACKGROUND OF THE INVENTION

Mobile ad-hoc networks (MANET's) are becoming increasingly popular because they operate as self-configuring networks of mobile routers or associated hosts connected by wireless links to form an arbitrary topology. The routers, such as wireless mobile units, can move randomly and organize themselves arbitrarily as nodes in a network, similar to a packet radio network. The individual units require minimum configuration and their quick deployment can make ad-hoc networks suitable for emergency situations. For example, many MANET's are designed for military systems such as the JTRS (Joint Tactical Radio System) and other similar peer-to-peer or Independent Basic Service Set Systems (IBSS).

TDMA technology is becoming more popular for use in these mobile ad-hoc network systems. In a TDMA ad-hoc network, channel access scheduling is a core platform of the network structure. Some problems, however, are encountered with distributed channel scheduling used in a multi-hop broadcast networks. As known to those skilled in the art, the optimum channel scheduling problem is equivalent to the graph coloring problem, which is a well known NP-complete problem, cited in numerous sources. Many prior art systems assume that the network topology is known and is not topology transparent.

There is a changing topology in a TDMA ad-hoc network. Before the network is formed, the topology cannot be learned. Without knowing the network topology, the nodes in the network should still find a way to communicate. Once the nodes learn about the transmit and receive schedules among neighboring nodes, these neighboring nodes may have moved away, disappeared, or new nodes may have moved in. The rate of resolving the scheduling must be fast and bandwidth efficient such that the network can be stabilized.

In a dynamic ad-hoc network system, fault tolerance and load balancing is important because radio links in the path can break. In such cases, broken links should be detected and new paths set-up, This overhead could disrupt the voice or data steams. In some cases, the network may be busy and cannot set up new paths and bring down the old paths, leaving no time or capacity for the actual data delivery.

The radio link stability is also a factor in path maintenance or overhead. Fault tolerance, for example, could help maintain the data path in service much longer and better. Load balancing would help increase the overall data throughput, or equivalently, reduce the traffic burden on certain links.

There are some current solutions, however, that reduce these problems. In a hop-to-hop system, a data packet is transmitted based on local hop-to-hop routing decisions. In this system, there is usually no obligation for the nodes to guarantee the delivery of a data packet to the next hop. Sending duplicates over multiple links (locally decided), however, could be used. This is considered a solution for the fault tolerance. But the drawback is that the same data packet must be sent over many branches, eventually leading to partial or complete flooding of the packet in the network, causing unnecessary duplicates of the packet.

A path local repairs system can be a solution to the above hop-to-hop flooding problem. In this system, a path is established for the data delivery, but in the wireless networks, the topologies change and the established path may not be valid any more over time because the links may be gone. To fix the problem, a locally initiated repair mechanism (local repair) can be used to rescue the path. This is an adequate solution, but has some drawbacks because it takes time to detect the broken links and find a reroute path to the downstream of the path.

A multiple path, fully disjoint (FD), or partial disjoint (PD) solution is another system. The multiple paths used for the duplicated data packets can be created for redundancies in delivery. The paths, however, still need to be maintained. Also, some bandwidth is wasted because of path redundancies. In the PD system, the data traffics are merged at the critical region of the data paths. A critical region is the part that the nodes or the link share among the data paths. There could also be an extra burden of traffic in the critical regions.

SUMMARY OF THE INVENTION

In accordance with one non-limiting example of the present invention, a method and mobile ad-hoc network (MANET) communicates between a source node and destination node and includes a plurality of intermediate nodes. A main communication path is established between the source node through intermediate nodes to the destination node based on an underlying routing protocol. Alternative communication paths are established among neighboring nodes as standby nodes that are positioned an "n" hop distance from nodes of the main communication paths to form a tube of multiple communication paths from the source node to the destination node. The main communication path reconfigured within the tube of multiple communication paths to an alternative communication path using at least one standby node when the main communication path is broken.

The standby nodes can be positioned about a 1-hop distance from the nodes forming the main communication path. When a predetermined number of data packets have been dropped in a node, a determination that the main communication path is broken can be established. It is also possible to monitor standby nodes from the transmission of data packets from nodes within the main communication path. A node can be assisted within the main communication path by transmitting a data packet from a standby node after a predetermined delay in transmitting a data packet from a node in the main communication path. Data packets can also be forwarded from the source node to the destination node using a time division multiple access (TDMA) protocol. A second main communication path between another source and destination node can be formed and a second tube of multiple communication paths formed. One tube can have priority over the other tube. Also, nodes can be shared within first and second tubes of multiple communication paths. One or more tubes can have unidirectional and bidirectional communications, depending on the specific requirements. It is also possible to retransmit data packets through standby nodes to obtain full flooding of packet data and ensure a high level fault tolerance.

In yet another aspect, each standby node can monitor selected standby nodes and nodes in the main communication path to determine if data packets are being forwarded and transmitted successfully.

A mobile ad-hoc network (MANET) is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with one non-limiting example of the present invention, a tube, i.e., "trellis" of multiple communication paths, i.e., also termed multi-paths, is constructed along a "primary" or main communication path. This structure is similar to a "tube" or "trellis" of nodes and follows the primary or main communication path of nodes. There is a special property of the nodes in this tube or trellis of multiple communication paths, i.e., multi-paths (TOMP) for a fully disjoint (FD) and partial disjoint (PD) system. The nodes are aware of the transmission of the neighboring nodes in the TOMP. It should be understood that throughout this description, the acronym TOMP refers to the "tube" or "trellis" of multiple communication paths formed by the nodes in the main communication path from the source to the destination through intermediate nodes, and includes the neighboring, i.e., "standby nodes" located an "n" hop distance. Duplicated transmission thus may not be required in order to afford fault tolerance. This can be achieved in TDMA systems because the transmissions are sequential.

The construction of the TOMP is dynamic and distributed to the nodes along the primary or main communication path. If the main communication path is broken, another link in the TOMP can automatically replace the broken link and become the new main communication path.

In the TOMP, there is no limitation on the fully disjoint or partial disjoint multi-paths. The nodes in the TOMP are dynamically obtained and locally maintained. The main communication path can be dynamically changed inside the "tube." It can be migrated to adapt to new changes in the topology. The bandwidth usage in the TOMP can be equivalent to that of the single path and at the same time achieving the capability of fault tolerance. The use of TOMP for fault tolerance can be easily configured to support load balancing.

The TOMP can be a mechanism that can support uninterrupted voice service in unstable networks such as ad-hoc networks with link impairments because of fast and slow fading and radio movements. It is simple to implement at a low cost.

Figure 1:
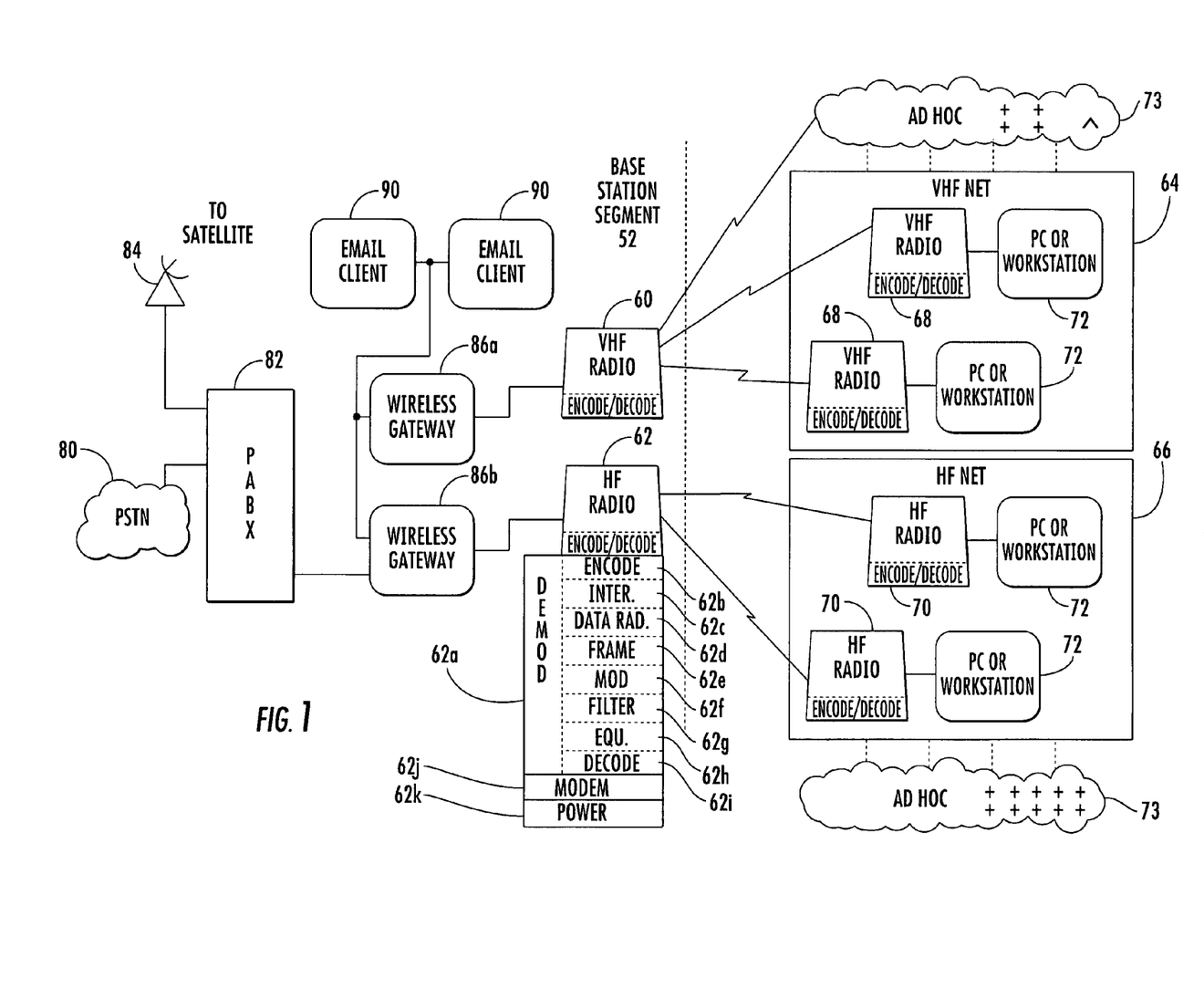
FIG. 1 is a block diagram of an example of a communication system that can be used in accordance with non-limiting examples of the present invention.

For purposes of description, some background information of coding, interleaving, and an exemplary wireless, mobile radio communications system that includes ad-hoc capability and can be modified for use with the system and method of the present invention is now set forth with regard to FIG. 1. An example of a radio that could be used with such system and method is a Falcon™ III radio manufactured and sold by Harris Corporation of Melbourne, Fla., which can be modified for use with mobile ad-hoc networks (MANET's). It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt-.mil), which is hereby incorporated by reference in its entirety, The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 1. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. These and other circuits operate to perform any functions necessary for the present invention, as well as other functions suggested by those skilled in the art. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Non-limiting examples of the present invention incorporate a "tube" or "trellis" of multiple communication paths, i.e., multi-paths (TOMP), similar to a tube along a main data or communication path to provide fault tolerance. In the TOMP, transmissions are monitored by the neighboring nodes forming standby nodes. The nodes in TOMP are aware of the transmission of nodes in the main communication path. Duplicated transmission may not be required to afford fault tolerance and can be achieved in TDMA systems because the transmissions are sequential. The construction of a TOMP is dynamic and distributed to the nodes along the primary path.

Figure 2:
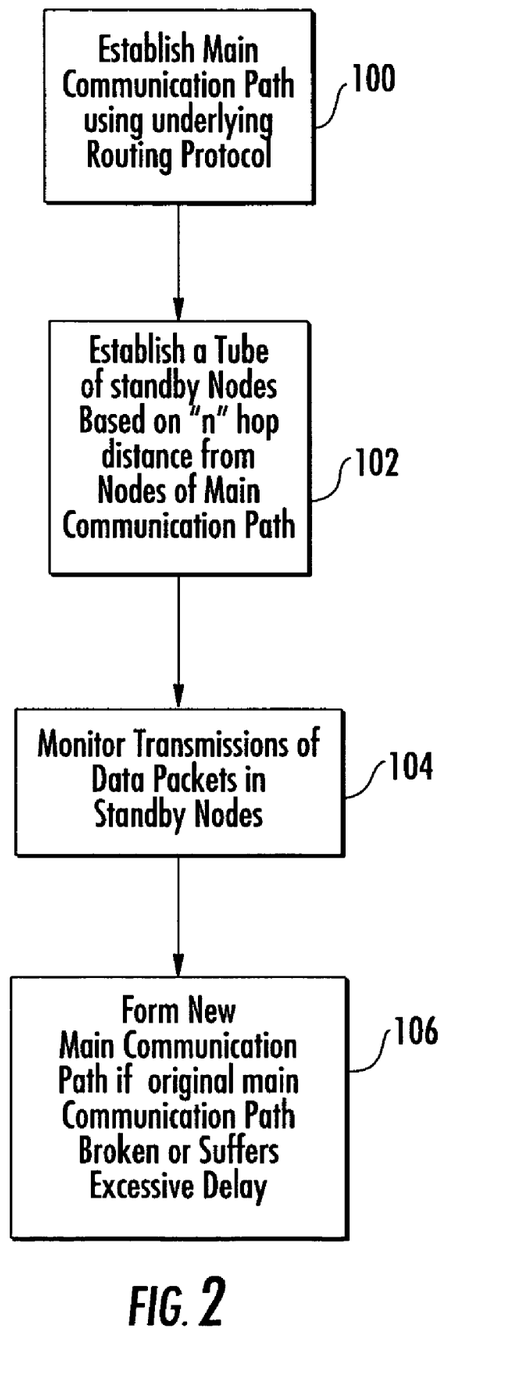
FIG. 2 is a high-level flow chart showing a basic sequence in accordance with one non-limiting example of the present invention.

FIG. 2 shows a high-level block diagram as a flowchart and showing basic sequence steps that can be used in accordance with a non-limiting example of the present invention. A main communication path is established using an underlying routing protocol (block 100). A tube of standby nodes is established based on "n" hop distance from nodes of the main communication path (block 122). The transmissions of data packets are monitored by the standby nodes (block 104). A new communication path is formed if the original main communication path is broken or data packets are delayed as monitored by the standby nodes (block 106).

There now follows a more detailed background and technical description to understand basic aspects of the invention as described in accordance with non-limiting examples.

TOMP has two prerequisites requirement on the mobile ad-hoc network (MANET). It is TDMA based and the packet forwarding is in a broadcast fashion. TOMP can also work with most ad-hoc routing protocols. A specific route is first obtained from the underlying routing protocol. A labeled data path is established based on the provided route. The tube of the TOMP can be constructed based on the labeled data path. The labeled data path is the main data path of the tube of the TOMP.

With TOMP, the data delivery can be more deterministic while the tube can be locally maintained. The bandwidth usage in the TOMP can be equivalent to that of a single path and at the same time achieve fault tolerance.

As is well known, ad-hoc network routing and data delivery is a difficult and complex problem. There are many different routing protocols and methods used to solve different aspect of the network issues. A background of the technology is given followed by a description of how the "tube" or "trellis" of multiple communication paths (TOMP) can be used.

A Mobile Ad-hoc Network (MANET) can be described as an autonomous system of mobile nodes. The network is typically self-organizing without the assistance from any centralized administration. Because there are no fixed and centralized base stations to maintain routes, the routing capability is typically distributed to the individual mobile nodes. Each node is usually capable of discovering routes to a destination, and each node may also act as an intermediate node, i.e., a repeater, for forwarding the data packets in a multiple hop connection. The network topology may change with time as the nodes move, enter, or leave the network. Therefore, dynamic routing capabilities and route maintenance mechanisms are usually incorporated into the nodes.

There have been many different ad-hoc network protocols, which are usually divided into two different approaches, i.e., 1) proactive, and 2) reactive. Proactive protocols, such as OLSR, CGSR, DBF, and DSDV, periodically send and exchange routing messages in the entire network to catch up with the latest changes in the topology. Reactive protocols, such as ABR, DSR, AODV, CHAMP, DYMO, and TORA, however, search for a route on-demand. A route discovery or route request message is typically flooded into the network upon request. As the request message comes to the destination node, a route reply message, carrying the whole path from the source to the destination, is transmitted back to the source node.

Some protocols combine the two approaches, but in any event, the goal of the ad-hoc routing protocol is to find the current path, defined as a sequence of intermediate nodes, from the source node to a destination node. Due to the changing topology and channel conditions, however, the routes may have changed over time. Therefore, a route entry in the routing table may not be updated when is it about to be used. The routes must be maintained either on demand or on a regular basis.

Routes are maintained in two different levels. A first level is more concerned with the maintenance of the routing table, which is refreshed either on a regular basis or on-demand. A second level is the maintenance of an actively used route path, which may have become unstable and unusable due to the node movement, blocking by objects, terrain conditions, and other link impairments. The source node should be notified of the path errors, and another candidate route chosen or a new route discovery issued.

For table driven routing protocols, once a broken route is detected, it may take some time for the protocol to react and resolve and find a new route. Most link state based ad-hoc network protocols require a convergence of routes in the route table. For example, in Optimized Link State Routing (OLSR) protocol, a local route change would have to be broadcast to all other nodes in the network such that in the route table, the topology view is consistent. If the route table is not consistent, data packets may not be routed correctly. The data packets are forwarded from hop to hop, originating from the source node towards the destination node. Due to the node movement, some of the intermediate nodes may have already moved out of the range of each other, therefore breaking the path of delivery. Packets sometimes are dropped and the broken path condition should be detected as soon as possible to form alternative paths.

For reactive ad-hoc network protocols, the route is typically discovered on-demand. The nodes in the network keep track of the changes of the topology, but only for the part on which they send traffic. Before data is sent, the destination path is discovered by sending a route request. It takes some time for the route request to travel to the destination node, which returns the path back to the source node. Explicit route path information can be added to the packet header such that intermediate nodes can forward the packet.

A data path can also be set-up in advance. A source node transmits a path label along a newly discovered route to the destination node. The intermediate nodes remember the path label. Subsequently, the data packets having a known label are forwarded correctly. Again, if the data packet cannot be forwarded correctly along the path, the source node is notified of the path error. The source node may issue a new route discovery.

Some protocol provides local repair to a broken route. A repairing node may issue a locally bounded, limited path search downstream of the path. Due to the scope of a limited search, the response time is expected to be faster. If it is successful, then the packets may flow through the detour route. The repairing node would send a notification to the source node about the change to the path. Local repair shortens this reaction time to fixing the path failure. The mechanism, however, is not instantaneous.

A data packet can typically be forwarded from the source node to the destination node by two major methods. The forwarding decision can be made by the source node such that explicit route information is attached to the packet header. In the second method, the forwarding decision is made by intermediate nodes. If the node has a view of the network topology, the packet may be forwarded based on the routing table. If the node has a label path established for labeled packets, the forwarding decision can be based on the label of the packet. If the node has no knowledge of the network, and no established data path, the packet can be flooded to all neighbors.

In a unidirectional link, however, the sender node may not know if the receiver node actually received the packet. The sender node may have an excessive number of packets in its transmission queue. The packet to be delivered may be removed as if the packet is expired. The receiver node and the sender node may have moved apart further than the transmission range so that the packet can never by delivered via this specific link. The packets could be corrupted by signal fading or interference. ARQ (Automatic Repeat request) may be used to ensure a transmission success and a detection of a broken link. A significant delay may be incurred, however, waiting for an ACK and retransmission. Fault tolerance can be provided using multiple paths to deliver the same set of packets. More data packets can be delivered with less delay, but some trade-off is the radio resource utilization that is significantly reduced.

In ad-hoc networks, nodes are equipped with limited radio resources and data bandwidth. Data packets are typically classified according to the application requirement. Some applications require the data to be delivered in a time critical manner, while other applications require the data to be delivered in a robust manner. It is important to deliver different kinds of data packets differently and effectively according to the demands imposed by the system. For example, dropping a few voice samples is not as important as dropping a file data packet. Usually, a file data packet is less time critical, but it must be reliably delivered.

Due to the issues of data delivery and Quality of Service (QOS) requirements, packets may be duplicated in multiple communication paths so that the same packet has a higher chance of reaching its destination in time. In many multi-path routing protocols, the source node maintains a set of multiple communication paths as alternate routes in its route table. It should be understood that multi-path routes can be discovered in a similar fashion as a general route discovery.

Most of the generic route discovery mechanisms result in multiple paths without extra efforts. It is up to the source node to decide how many multi-path candidates should be maintained in the route table. When the source node is about to transmit a data packet to a destination with multi-path routes, the node may duplicate data packets, each on a separate member route of the multi-path, or the source node may use an alternative path as a backup path in case the main path is notified as broken. A higher level of fault tolerance can be achieved by sending duplicated data packets. The multiple paths can be fully disjointed or partially disjointed. A better fault tolerance can be served by the fully disjointed multiple paths. As multiple paths are used for fault tolerance, data packets are being forwarded redundantly on each member route of the multi-path. The network wide bandwidth consumption will be proportionally increased.

In accordance with non-limiting examples of the present invention, the tube or trellis of multi-paths (TOMP) is similar to a tube along a main data path to provide fault tolerance. TOMP transmissions are monitored by the neighboring nodes as standby nodes. The nodes in TOMP are aware of the transmission from nodes in the main communication path. Duplicated transmission may not be required to afford fault tolerance and can be achieved in TDMA systems because the transmissions are sequential. The construction of a TOMP is dynamic and distributed to the nodes along the primary path.

The advantages of TOMP include data delivery that is more deterministic, while allowing the tube to be locally maintained. The bandwidth usage in the TOMP is primarily equivalent to a single path and achieves fault tolerance.

For purposes of clarity, some definitions of various terms and acronyms follow:

A Trellis (Tube) of Multi-paths (TOMP) is constructed on an intertwined and multiplexed multi-path (multiple communication paths) to provide data delivery with fault tolerance based on a TDMA based ad-hoc network.

The Main (communication) Path (MP) is a labeled data path connecting the source node to the destination node. The MP is a route path obtained from the existing underlying routing protocol.

Main Path—Explicit Route Object (MP-ERO) is a piece of data included in the packet, containing information representing the MP.

Nodes that belong to the MP can be referred to as MP-N. A node of the MP is responsible for data forwarding.

Stand-by Nodes (ST-N) are in the TUBET. The nodes in the TUBET, neighboring to the MP nodes, help as stand-by nodes.

A TUBET is a "tube of the TOMP" and is the tube constructed from the MP. The width of the tube in one non-limiting example is a 1-hop neighborhood to the MP. The nodes that are within one hop distance of the MP would be included in the TUBET in this non-limiting example.

Tube Label (TL) is the identification name of the tube. It is a unique label in the network. The TL is first associated with a MP and then the corresponding TUBET.

A TL having a value of X is called TL_X. For example, TL_X is a TL, and TL_Y is another TL. These two terms identify two different TUBET's.

A tube session (T-Session) is a small task in a node that provides related assistance and service to an established TUBET. If there is no data packet being served by the T-session, it is timed-out and removed.

Time Delay Tolerance (TDT) is a parameter of the TUBET. It defines how long a data packet delay can be tolerated and still not considered as dropped. For example, an intermediate node in the MP may not be able to send a packet due to the overloaded queue in its TX buffer. The neighboring nodes in the TUBET, which overheard the same packet, may not immediately help to forward the particular packet until the TDT is exceeded.

Packet ID (PKID) identifies the uniqueness of a packet. A packet that has been forwarded would not be forwarded again by the same node.

Monitoring Node List (MNL) is a list of nodes in the MP that is directly observable by a ST-N in the TUBET. For any given ST-N node, the 1-hop nodes which are also in the MP are included in the MNL.

Tube Repair Request (TRR) is a message that the TUBET may be modified or aborted.

TX-Pacing is the pace of transmission and is supposed not to violate the TDT threshold. The next hop in the MP should continue to forward the data packet within the TDT threshold. Otherwise, an incorrect TX-Pacing could be observed by the ST-N.

Tube Setup Request (TS_REQ) message is used to setup the TUBET. A TL and a complete path, MP-ERO are attached in TS_REQ packet. Receiving the TS_REQ will cause the nodes along the MP to setup the T-session. The TUBET is formed as the 1-hop neighbor nodes also setup their corresponding T-sessions.

Tube Setup Acknowledgement (TS_ACK) is used to notify the source node about the success of the setup. If it does not come within a time limit, the tube will be aborted.

Confined Full Flooding (CFFT) in TOMP is a data forwarding policy.

In operation, TUBET can be constructed based on a given route path. The source node transmits a TS_REQ message to the destination node via an existing route path. The path is called the main path (MP) of the TOMP. The route can first be obtained from the underlying routing protocol such as OLSR, AODV, DSR, or similar protocol. The MP contains a sequence of nodes, connecting the source node to the destination node. A unique label, i.e., the Tube Label (TL), is associated with the MP. The TS_REQ packet contains a TL, a MP-ERO, other predetermined control flags, configuration parameters, and an optional TDT. If TDT is not included, a default value is used. The default value is configured in the nodes.

As the TS_REQ is forwarded along the MP, the message is overheard by all the nodes along the path. The MP nodes are named as MP-N. The other neighbor nodes are called standby (ST-N) nodes. The ST-N nodes are the direct neighbor of any of the nodes in MP. By receiving the label TL directly from a MP-N, these nodes setup a T-session because they are the members of the TUBET. The T-session provides service to labeled data packets in the TUBET. The TL can be time stamped. If the nodes in the TUBET have not received any labeled packets, the TUBET can be ruptured and removed. Any node can be configured to serve a multiple TUBET. The TUBET can also be independent of each other, except that the physical resources are shared between the tubes. The TUBET can also be configured to support different priorities. For example, a TUBET can serve a voice call and would have a higher priority over another TUBET serving for IP data.

If a Tube is setup successfully, the source node will receive a Tube Setup Acknowledgement (TS_ACK) originated by the destination node. If the TS_ACK is not received in a time-out, the Tube construction is aborted. A new main path is refreshed or re-established for a new Tube to be setup. Once the destination node has received the TS_REQ message, it will immediately reply with a TS_ACK via the coming MP. If the network supports the use of a unidirectional TUBET, the destination node may try to setup a different TUBET, for example, TUBET-R towards the source node. As the TS_ACK has come back to the source node then the TUBET is known to be established. If the source node does not receive the TS_ACK by a time-out, then the conceived TUBET is aborted.

The data delivery path is setup using the TUBET and labeled by a TL. The tube can be configured as either unidirectional or bidirectional. For a unidirectional TUBET, a reverse TUBET is setup in a similar way as the forward tube. In the unidirectional TUBET, the TL is different and the set of nodes involved in the forward and reverse tube may be different. In bidirectional TUBET, the set of nodes are common, and only one label is required for serving both directions.

In the TS_REQ, a TDT value is included. It defines how long a neighbor node should wait before it determines to help. Each ST-N node has a Monitor Node List (MNL). For any node that is a direct neighbor of a ST-N and those nodes that are also in the MP are put into the MNL. With a MNL, the monitoring scope is limited. A ST-N can be watching the labeled packet delivery in the MNL. Since it is a direct neighbor of the MNL, any packet transmitted by the MNL will be overheard by the ST-N, and because the ad-hoc network is TDMA based, a single transmission in the neighborhood is reserved to one node at a time. All 1-hop neighbor nodes would be able to receive the same packet without any extra cost.

The ST-N is constantly watching if the labeled packet transmission is violating the TX-Pacing. The TX-Pacing violate rule is defined by the TDT level. For example, if a ST-N node has a list of 3 nodes in the MNL, node-A, node-B, and node-C, the ST-N may not require the order of forwarding by the nodes. It is monitoring if a new data packet, for example, with PKID=12, is first transmitted by one of the three nodes A, B, or C. The next transmission among the three nodes must occur within the time period, defined by TDT. Once it has heard that all three nodes, A, B, and C have done their transmission within the TX-Pacing limit, without exceeding the TDT time, the ST-N node can discard the overheard packet, PKID=12 safely. If any of the MNL nodes does not transmit the label packet in time, the ST-N can transmit it when its TX time slot has arrived. A ST-N may choose to abort the help if it hears another ST-N has already helped transmit the packet, for example, with PKID=12.

This mechanism helps to place the label data path on delivery without using any unnecessary radio resource for retransmission. As the ad-hoc network is full of unstable and indeterminate link characteristics, no data packet may be guaranteed. This fault tolerance mechanism helps to backup and improve the data delivery significantly.

Packets or messages that are delivered in the TUBET should be labeled with the corresponding TL and a unique packet sequence number, PKID. This sequence number is used for identifying a missing packet or the end of the whole transmission. A packet is typically forwarded by any nodes in the TUBET at most once. In some applications, the sequence of the PKID can be used to determine if a packet has been missing. It is typically not required to act on such information because some TUBET's can tolerate some level of packet drops, for example, a TUBET for serving voice can be configured to allow some voice samples dropping without triggering an alarm.

If the labeled packet has not been received by some portion of the TUBET for a significant period of time, then the node will remove the T-session for the TUBET. If the node has been notified from the routing protocol that the routes to the downstream MP are broken, it will end the T-session of the TUBET.

In a bidirectional TUBET, hop limited acknowledgement can be implemented to ensure the downstream of the MP works fine. Failure can be detected from the missing acknowledge from the downstream nodes. In a unidirectional TUBET, tube failure detection may not be easy. It may rely on the Tube Ending time out to shut down the TUBET.

The TUBET can morph over time to adapt to the changes in the topology if those changes are steady. The MP-N nodes became responsible for data delivery. If a specific MP-N has disappeared or failed to follow the TX-Pacing, a ST-N node may replace it. The ST-N node can notify the neighbor of its status change. The status change may also be propagated to the other parts of the TUBET. The route table may also be updated to reflect the change.

If the TUBET has detected a broken tube, a local repair mechanism may be used. It may request the underlying protocol to find a local detour to the downstream nodes. A hop limited TUBET may be setup to connect to the downstream tube.

The Confined Full Flooding in TOMP (CFFT) can be a simplified data forwarding policy to control how data are forwarded in the TUBET. The TX-Pacing and the use of TDT can be a data path policy to ensure QOS control. In some implementations, the systems may simplify the policy as full flooding in the area of the TUBET. In this simplified policy CFFT, the source node can distribute a label TL to identify the TUBET. As the TUBET has been established, the stand-by nodes in the TUBET would retransmit any new packets they have received. As a result, the data packets may be received by the destination node with a high level of fault tolerance while the confined full flooding in the TUBET would not take a large radio bandwidth compared to the full flooding network.

There now follows a brief description of an application of TOMP. The tube is effective and efficient, similar to full flooding data forwarding mechanism that is confined to a tube along the data path.

In CFFT policy, the nodes in the TUBET may remember the TL and retransmit any labeled received packets only once. The MP nodes may have to broadcast their identity and the tube TL as a "keep-alive" message. The MP nodes can define the path of the tube. If a "keep-alive" is not heard, the stand-by nodes may remove the TL. The CFFT is useful when certain fault tolerance in data forwarding is desired.

The TX-Pacing policy provides a desired QOS control over the data forwarding. The main task for each node in the TUBET is to remember the TL and monitor the transmission time of each labeled packet among its MNL. The tube may rely on this "keep-alive" to maintain the tube, or allow the tube to disintegrate when no labeled data packet is actively flowing in the tube. The MP nodes can define the center of the tube. The TX-Pacing policy implementation of TOMP is useful in applications where the radio bandwidth resource is a scarce entity, while the nodes may have to provide a slightly more processing for packet monitoring.

Figure 3:
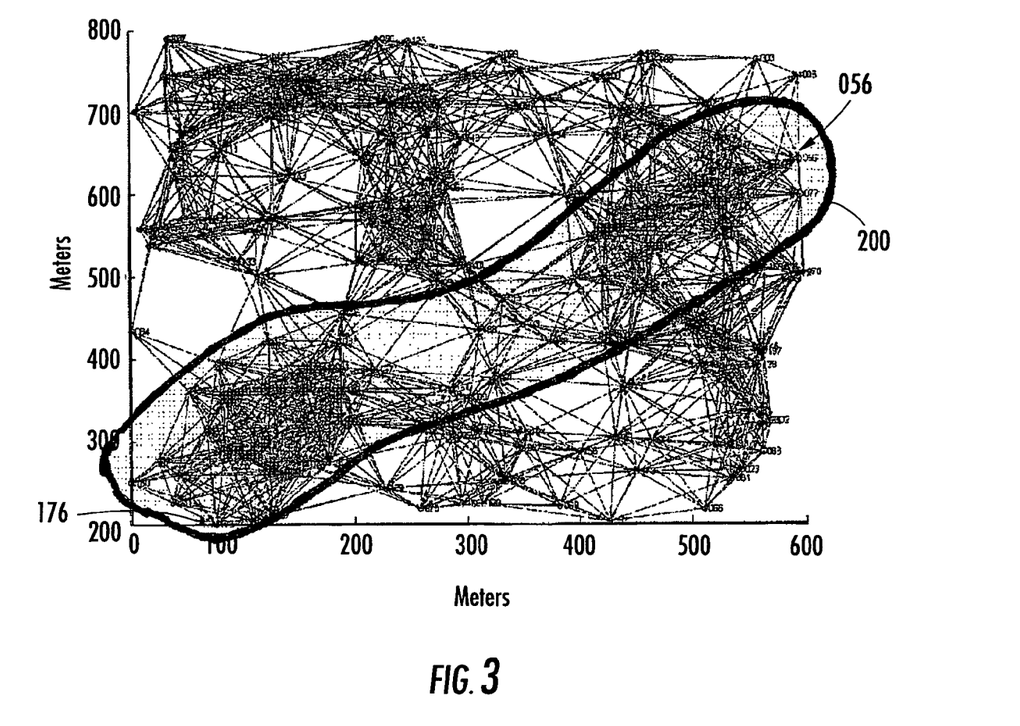
FIG. 3 is a graph showing a network map of 200 nodes and showing node 176 communicating with node 56 and showing the formed tube (trellis) of multiple communication paths, also referred to as a TUBET, in accordance with non-limiting examples of the present invention.

FIG. 3 is a graph showing a network of 200 nodes. Node 176 communicates with node 56. The TUBET shown at 200 extends between the two nodes. The data path is constructed between node 176 and node 056. For a single linked data path, the packet may be dropped due to interference, channel fading, shadowing, and similar reasons. Sometimes, the nodes may have moved away enough to break a particular link in the path. The chance for a packet to be dropped is high. The route maintenance takes time and radio resource to re-establish the path. When a tube (TUBET) is constructed as shown in this network diagram of FIG. 3, each node on the main path would have a few neighboring ST-N nodes as stand-by nodes to help, in case a packet has been lost. Thus, the TOMP as described is useful and powerful in a dense network.

Figure 4:
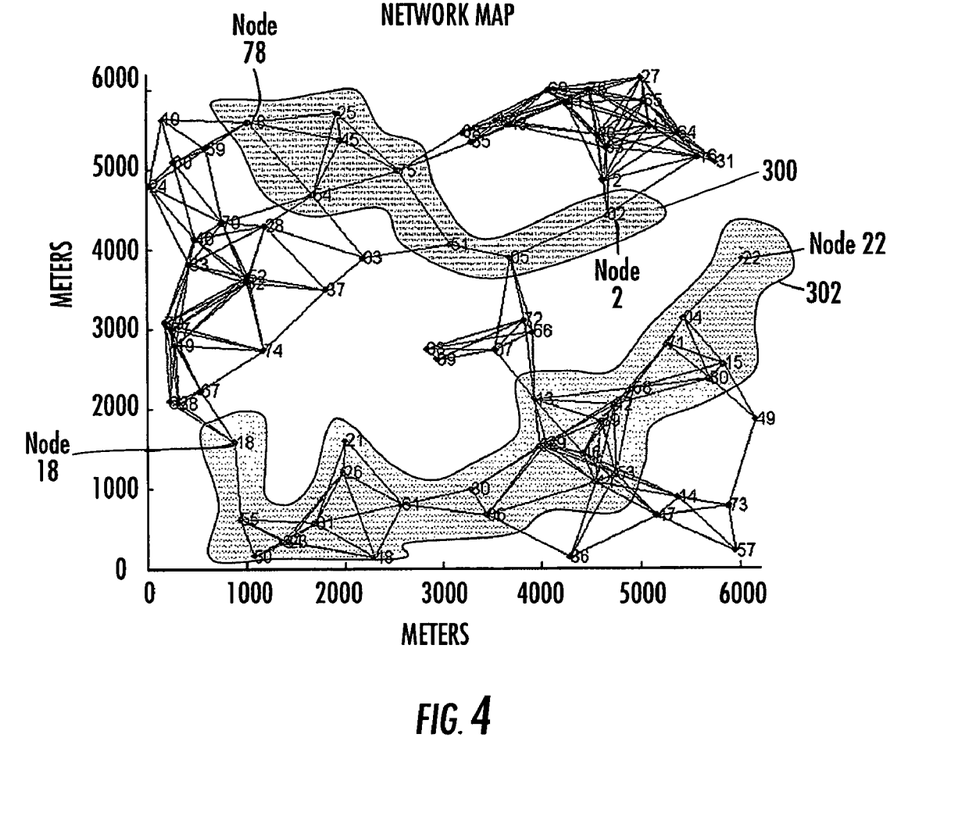
FIG. 4 is another graph showing a network map and upper and lower formed tubes, in which an upper tube provides data delivery from node 78 to node 2 and a lower tube provides data delivery from node 18 to node 22, in accordance with non-limiting examples of the present invention.

In a less dense network such as shown in the example of FIG. 4, the TUBET can be setup in a similar manner as in a dense network. FIG. 4 illustrates the two TUBET's 300, 302 in the network map. The upper tube 300 provides data delivery from node 78 to node 2. The lower tube 302 provides data delivery from node 18 to node 22. However, in some portions of the tube, for example, from node 51 to node 02 in the upper tube shown at 300, the fault tolerance is not better than a single linked path. In the lower tube 302, the tube may in general outperform any single linked data path because there are multiple ST-N nodes along the tube.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for communicating between a source node and a destination node in a mobile ad-hoc network (MANET) also comprising a plurality of intermediate nodes, the method comprising:
   providing a plurality of mobile wireless communications devices, each comprising a wireless transceiver and forming the MANET as source, destination, intermediate and standby nodes;
   establishing a main communication path between the source node through intermediate nodes to the destination node based on an underlying routing protocol;
   establishing alternative communication paths among neighboring nodes as standby nodes that are positioned an "n" hop distance from nodes of the main communication path to form a tube of multiple communication paths from the source node to the destination node and forming the tube of multiple communication paths to obtain one of unidirectional and bidirectional communications; and
   reconfiguring the main communication path within the tube of multiple communication paths to an alternative communication path using at least one standby node when the main communication path is broken.

2. The method according to claim 1, which further comprises establishing the tube of multiple communication paths from standby nodes that are a 1-hop distance from an adjacent node within and forming part of the main communication path.

3. The method according to claim 1, which further comprises determining that the main communication path is broken when a predetermined number of data packets have been dropped at a node.

4. The method according to claim 1, which further comprises monitoring at standby nodes the transmission of data packets from nodes within the main communication path.

5. The method according to claim 1, which further comprises assisting a node within the main communication path by transmitting a data packet from a standby node after a predetermined delay in transmitting the data packet from a node in the main communication path.

6. The method according to claim 1, which further comprises forwarding data packets from the source node to the destination node using a time division multiple access (TDMA) protocol.

7. The method according to claim 1, which further comprises forming a second main communication path between a source and destination node, and forming a second tube of multiple communication paths, and selecting a tube to have priority.

8. The method according to claim 7, which further comprises sharing nodes between first and second tubes of multiple communication paths.

9. The method according to claim 1, which further comprises retransmitting data packets through standby nodes to obtain full flooding of packet data and ensure a high level of fault tolerance.

10. A method for communicating between a source node and a destination node in a mobile ad-hoc network (MANET) also comprising a plurality of intermediate nodes, the method comprising:
    providing a plurality of mobile wireless communications devices, each comprising a wireless transceiver and forming the MANET as source, destination, intermediate and standby nodes;
    establishing a main communication path between the source node through intermediate nodes to the destination node based on an underlying routing protocol;
    establishing alternative communication paths among neighboring nodes as standby nodes that are positioned an "n" hop distance from an adjacent node within and forming part of the main communication path to form a tube of multiple communication paths from the source node to the destination node and forming the tube of multiple communication paths to obtain one of unidirectional and bidirectional communications, wherein each standby node monitors a selected neighboring standby nodes and nodes in the main communication path to determine if data packets are being forwarded and transmitted successfully; and
    reconfiguring the main communication path within the tube of multiple communication paths to one of said alternative communication paths using at least one standby node when the main communication path is broken.

11. The method according to claim 10, which further comprises establishing the tube of multiple communication paths from standby nodes that are a 1-hop distance from the nodes forming the main communication path.

12. The method according to claim 10, which further comprises determining that the main communication path is broken when a predetermined number of data packets have been dropped at an intermediate node.

13. The method according to claim 10, which further comprises monitoring at standby nodes the transmission of data packets from a majority of nodes within the main communication path.

14. The method according to claim 10, which further comprises assisting a node within the main communication path by transmitting a data packet from a standby node after a predetermined delay in transmitting the data packet from a node in the main communication path.

15. The method according to claim 10, which further comprises forwarding data packets from the source node to the destination node using a time division multiple access (TDMA) protocol.

16. The method according to claim 10, which further comprises forming a second main communication path between a source and destination node, and forming a second tube of multiple communication paths, and selecting one tube to have priority over the other tube.

17. The method according to claim 16, which further comprises sharing nodes between first and second tubes of multiple communication paths.

18. The method according to claim 10, which further comprises retransmitting data packets through standby nodes to obtain full flooding of packet data and ensure a high level of fault tolerance.

19. A mobile ad-hoc network (MANET) comprising:
a source node, a destination node and a plurality of intermediate nodes forming a main communication path based on an underlying routing protocol;
a plurality of neighboring nodes as standby nodes that are positioned an "n" hop distance from nodes of the main communication path to form a tube of multiple communication paths as alternative communication paths from the source node to the destination node and said tube of multiple communication paths is operative for unidirectional or bidirectional communication, wherein each standby node is operative for monitoring selected other neighboring standby nodes and nodes within the main communication path to determine if data packets are being forwarded and transmitted successfully and reconfiguring the main communication path within the tube of multiple communication paths using at least one standby node when the main communication path is broken.

20. The MANET according to claim 19, wherein the tube of multiple communication paths comprises standby nodes that are a 1-hop distance from the nodes forming the main communication path.

21. The MANET according to claim 19, wherein each of said nodes are operative for transmitting data packets using a time division multiple access (TDMA) protocol.

22. The MANET according to claim 19, and further comprising a second main communication path and second tube of multiple communication paths between a source and destination node.

23. The MANET according to claim 22, wherein said second tube of multiple communication paths has a lower or higher priority than a prior formed tube.

24. The MANET according to claim 22, wherein nodes between first and second tubes of multiple communication paths are shared with each other.

* * * * *